US008004830B2

(12) United States Patent
Lu

(10) Patent No.: US 8,004,830 B2
(45) Date of Patent: Aug. 23, 2011

(54) QUICK-RELEASING STRUCTURE FOR FASTENING A HARD DISK, AND HARD DISK CARRIER AND COMPUTER SYSTEM USING THE SAME

(75) Inventor: Fu-Lung Lu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 205 days.

(21) Appl. No.: 12/385,032

(22) Filed: Mar. 30, 2009

(65) Prior Publication Data

US 2010/0165564 A1  Jul. 1, 2010

(30) Foreign Application Priority Data

Dec. 29, 2008  (TW) ................................ 97223580 U

(51) Int. Cl.
*G06F 1/16* (2006.01)
*H05K 5/00* (2006.01)
*H05K 7/00* (2006.01)
(52) U.S. Cl. ............................. 361/679.33; 361/679.34
(58) Field of Classification Search ............... 361/679.33
See application file for complete search history.

(56) References Cited

U.S. PATENT DOCUMENTS

| 5,599,080 | A | * | 2/1997 | Ho ................................ 312/334.7 |
| 5,788,211 | A | * | 8/1998 | Astier ........................... 248/674 |
| 5,801,920 | A | * | 9/1998 | Lee ............................. 361/679.31 |
| 6,097,608 | A | * | 8/2000 | Berberich et al. ............. 361/752 |
| 6,396,686 | B1 | * | 5/2002 | Liu et al. ...................... 361/679.33 |
| 6,487,081 | B2 | * | 11/2002 | Homer et al. ................. 361/730 |
| 6,498,722 | B1 | * | 12/2002 | Stolz et al. ................... 361/679.36 |
| 6,882,528 | B2 | * | 4/2005 | Chuang ........................ 361/679.35 |
| 7,006,351 | B2 | * | 2/2006 | Chen et al. ................... 361/679.34 |
| 7,327,565 | B2 | * | 2/2008 | Chen et al. ................... 361/679.33 |
| 7,345,237 | B2 | * | 3/2008 | Chen et al. ........................ 174/50 |
| 7,369,402 | B2 | * | 5/2008 | Huang ........................ 361/679.33 |
| 7,492,586 | B2 | * | 2/2009 | Peng et al. ................... 361/679.33 |
| 7,495,904 | B2 | * | 2/2009 | Liang et al. .................. 361/679.39 |
| 7,542,280 | B2 | * | 6/2009 | Hong et al. ................... 361/679.33 |
| 7,639,490 | B2 | * | 12/2009 | Qin et al. ..................... 361/679.34 |
| 2002/0101713 | A1 | * | 8/2002 | Eland ............................. 361/686 |
| 2003/0174464 | A1 | * | 9/2003 | Funawatari et al. .......... 361/685 |
| 2004/0032711 | A1 | * | 2/2004 | Kaczeus et al. ............... 361/685 |
| 2005/0063152 | A1 | * | 3/2005 | Chen et al. ...................... 361/685 |
| 2005/0088778 | A1 | * | 4/2005 | Chen et al. ................... 360/97.02 |
| 2007/0164170 | A1 | * | 7/2007 | Huang et al. ................. 248/27.1 |
| 2008/0174950 | A1 | * | 7/2008 | He ................................. 361/685 |

\* cited by examiner

*Primary Examiner* — Jinhee Lee
*Assistant Examiner* — Adrian S Wilson
(74) *Attorney, Agent, or Firm* — Bacon & Thomas, PLLC

(57) ABSTRACT

A quick-releasing structure is applied to a casing for installing a hard disk device. The quick-releasing structure comprises a spring plate, a handle, and two shock-absorbing members. The spring plate is connected to the casing; the two ends of the handle are coupled to the spring plate; two shock-absorbing members are connected to the two ends of the spring plate for fastening the hard disk device and producing shock-absorbing effect. By pulling the handle, the two ends of the spring plate being moved away from the casing, and the two shock-absorbing members being moved to release the hard disk device.

17 Claims, 5 Drawing Sheets

QUICK-RELEASING STRUCTURE FOR FASTENING A HARD DISK, AND HARD DISK CARRIER AND COMPUTER SYSTEM USING THE SAME

BACKGROUND OF THE INVENTION

1. Field of the Invention

The present invention relates to a quick-releasing structure for fastening a hard disk, specifically to a quick-releasing structure allowing for quick installation and removal of the hard disk, which can have significant effect for absorbing shock for the hard disk.

2. Description of the Related Art

In a computer system, all software programs that run various functions and data are saved in a hard disk device. Therefore, more emphasis should be put on the safety and stability of the use of a hard disk device to prevent data destruction of a hard disk device caused by improper use.

Generally, most hard disk carriers in industrial computers lock and fasten the hard disk device with screws to keep the stability of the use of the hard disk device. However, the aforementioned method, simply using screws to fix the hard disk device, does not provide the hard disk device with any shock-absorbing effect. Once the hard disk device is hit with an external force, internal structure of the hard disk or data may be destructed. Also, the installation and removal of the hard disk that uses screws to lock or unlock the hard disk device is inconvenient. Some hard disk carriers use with screwless design, which is made of plastic material. The prior art may provide with shock-absorbing effect because of features of the elasticity of plastic material. Although this quick-release design allows a user to install and remove a hard disk device conveniently, the structural strength of the hard disk carrier, made of plastic material, is not as great as a general metal carrier. Moreover, unlike a metal carrier, plastic material does not prevent electromagnetic interference.

SUMMARY OF THE INVENTION

A primary objective of the present invention is to provide a quick-releasing structure allowing for quick installation and removal of a hard disk device and producing significant shock-absorbing effect.

In order to achieve the above-mentioned primary objective, the quick-releasing structure of the present invention is applied to a casing for fastening a hard disk device. The quick-releasing structure comprises a spring plate, a handle, and two shock-absorbing members. The spring plate is connected to the casing; two ends of the handle are coupled to the spring plate; the two shock-absorbing members are engaged with two ends of the spring plate in order to fasten the hard disk device within the casing and to absorb vibration. When pulling outward the handle, the two ends of the spring plate are pushed and moved away from the casing because the central portion of the spring plate is fixed with the casing, and the hard disk device can be taken away as releasing the shock-absorbing members. The design of the quick-releasing structure of the present invention allows a user to install and remove the hard disk device rapidly without any tools. Furthermore, the shock-absorbing members can provide the hard disk device with shock-absorbing effect in many directions.

A hard disk carrier of the present invention is provided for fixing with a hard disk device. The hard disk carrier comprises a casing and two aforementioned quick-releasing structures. The two quick-releasing structures are disposed at two sides of the casing. A user can pull the handle of the quick-releasing structure on two sides of the casing, so as to take out the hard disk device from the casing or to place the hard disk device within the casing without any tools.

DETAILED DESCRIPTION OF THE PREFERRED EMBODIMENT

The advantages and innovative features of the invention will become more apparent from the following detailed description when taken in conjunction with the accompanying drawings.

Figure 1:
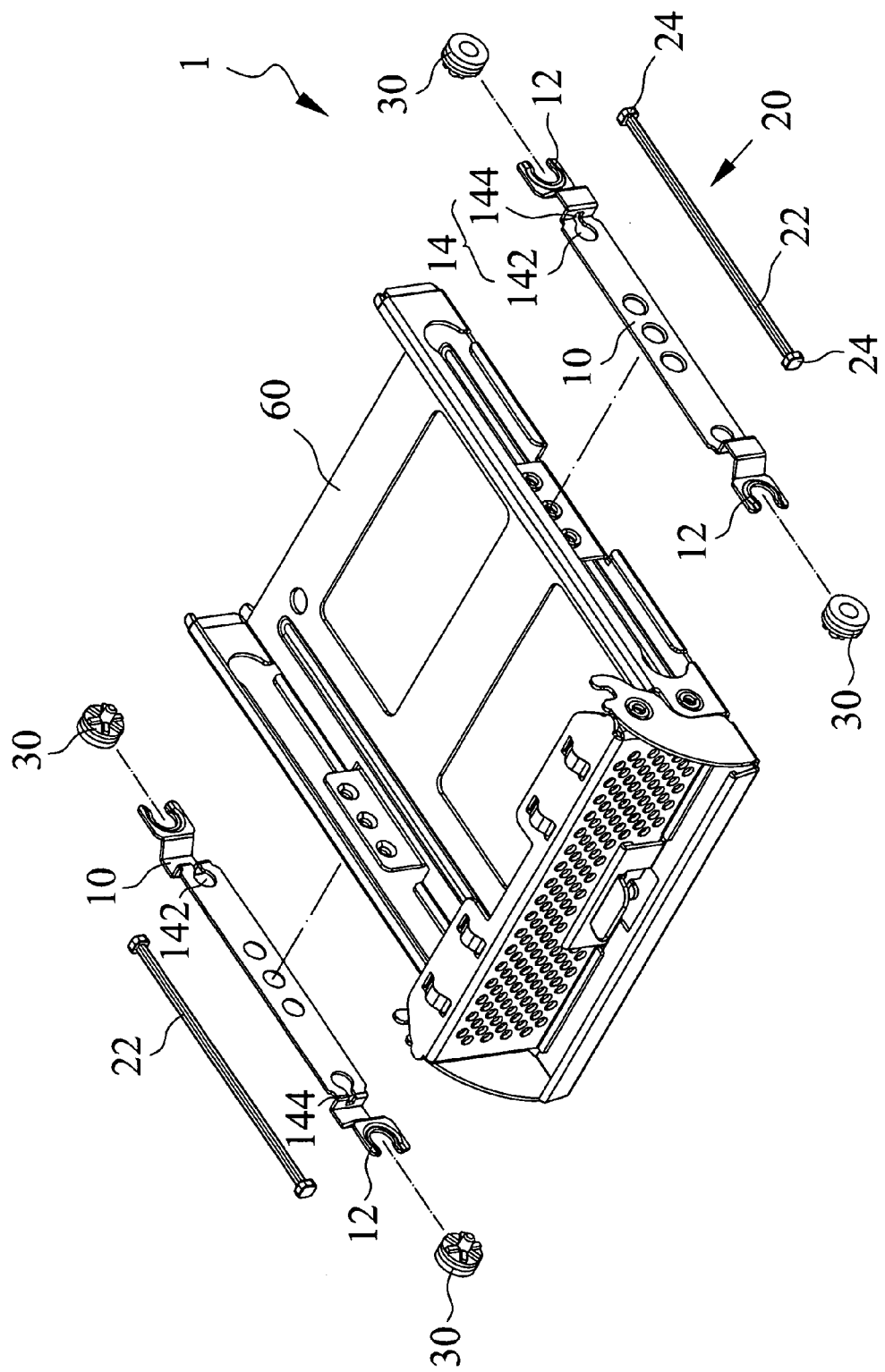
FIG. 1 is an exploded structural view of a quick-releasing structure of the present invention.

Please refer to FIG. 1 for an exploded structural view of a quick-releasing structure of the present invention. The quick-releasing structure 1 of the present invention can be applied to a casing 60. For example, the quick-releasing structure 1 can be applied to a casing of a computer system for fastening a hard disk device within the case.

As shown in FIG. 1, the quick-releasing structure 1 of the present invention comprises a spring plate 10, a handle 20, and two shock-absorbing members 30. The spring plate 10 is connected to the casing 60 in the middle thereof. A central portion of the spring plate 10 is fixed onto the casing 60 as a fixing point. The fix can be achieved with soldering, screwing or the like. The spring plate 10 comprises two fixers 12 at two ends thereof and two receiving holes 14. The two receiving holes 14 are located near to the two fixers respectively. Each receiving hole 14 comprises an inserting portion 142 and an engaging portion 144 adjacent and contiguous to each other. A diameter of the inserting portion 142 is larger than a width of the engaging portion 144. In addition, in this embodiment, the spring plate 10 is a metal spring plate, such as an iron spring plate. The metal properties can provide shielding effect that can prevent electromagnetic interference so as to protect the hard disk device.

The two ends of the handle 20 are coupled to the spring plate 10. In this embodiment, the handle 20 is made of elastic material and comprises a rod 22 and two protrusions 24. The two protrusions 24 are located at two ends of the rod 22 respectively. A diameter of the rod 22 is smaller than the width of the engaging portion 144. A maximum outside diameter of the protrusion 24 is between the diameter of the inserting portion 142 and the width of the engaging portion 144. Therefore, when fixing the central portion of the handle 20 onto the spring plate 10, one of the protrusions 24 of the handle 20 pass through one inserting portion 142 in corresponding position. The other protrusions 24 can also pass through the other inserting portion 142 by moving the rod 22. The rod 22 can be moved and engaged to the engaging portions 144. Thus, the two receiving holes 14 can be used for coupling the handle 20 and preventing the handle 20 from dropping out of the spring plate 10 when in use. In this embodiment, the rod 22 and two protrusions 24 are both cylinders, but they can also be in other shapes depending on the designs. For example, the rod 22 can be a cuboid pillar, and each protrusion 24 can be a sphere, etc. Also, the handle 20 can be made of other material or in other form. For example, the handle 20 can be a rope, which should not be limited to the description embodiments. When the handle 20 is broken or malfunctioned, the quick-releasing structure 1 of the present invention can be recovered by simply replacing the handle 20. This can reduce the cost for component replacement and increase the product life.

Two shock-absorbing members 30 are connected or engaged to the two ends of the spring plate 10. Each shock-absorbing member 30 is engaged and fixed with each fixer 12 of the spring plate 10. In one embodiment, the structure of the fixer 12 is C-shaped for engaging the shock-absorbing member 30. However, the form or shape of the fixer 12 can vary, which is depending on the needs or the design, and should not be limited to the figures. Each shock-absorbing member 30 comprises a fastening component and an elastic cushioning material portion. The fastening component of the shock-absorbing member 30 is used to fasten a hard disk device. The elastic cushioning material portion can absorb shock or vibration for the hard disk device. Since the structural design of the shock-absorbing member 30 can be varied and found in the prior art, there is no need for further description. Each fastening component of the shock-absorbing member 30 may correspond to a screw hole of the hard disk device so as to fasten the hard disk device within the casing 60 (as showing in FIG. 4).

Figure 2A:
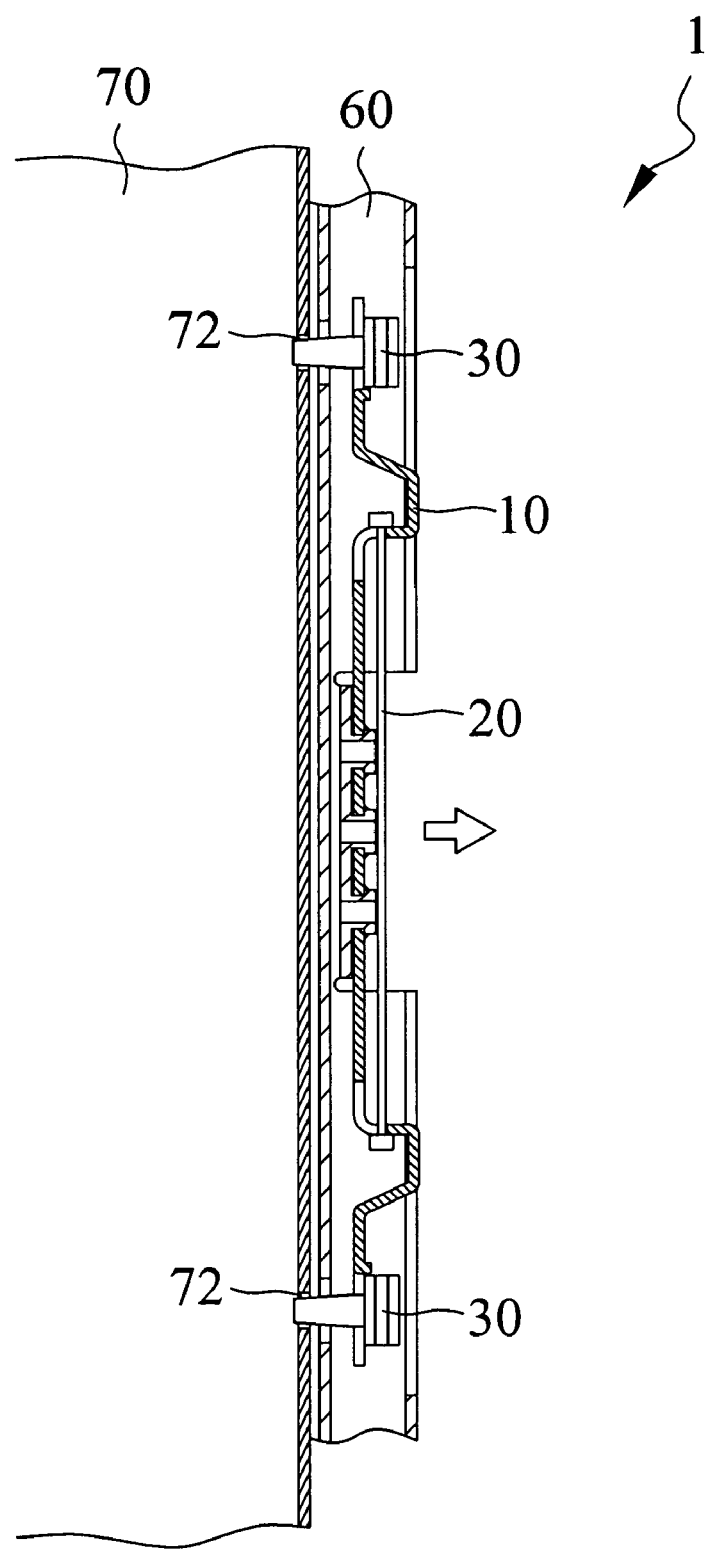
FIGS. 2(a) and (b) are schematic drawings of the quick-releasing structure of the present invention when in use before and after respectively.
Figure 2B:
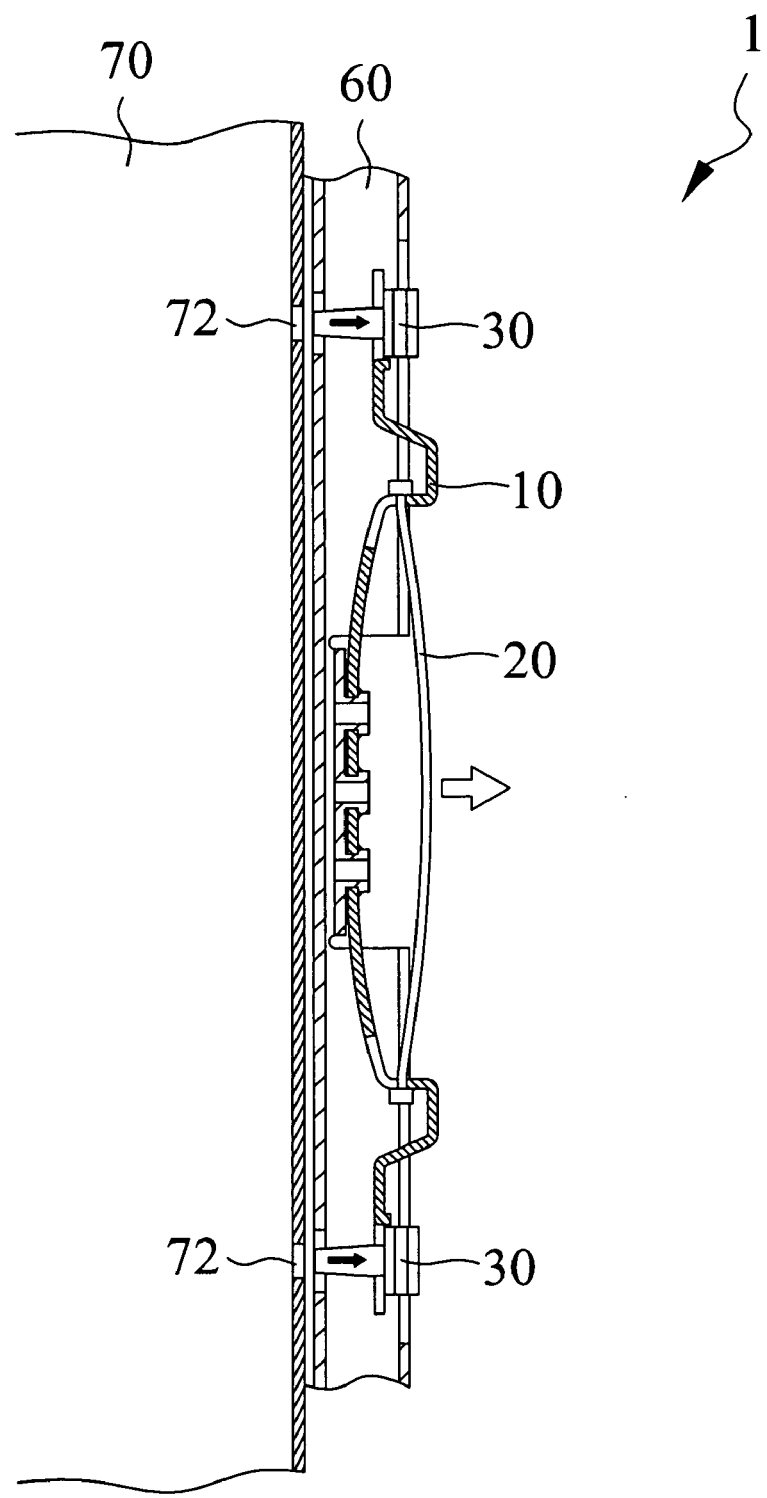

Please refer to FIGS. 2(a) and (b), which show schematic drawings of the use of the quick-releasing structure 1 of the present invention when in use before and after pulling the rod 22 respectively. FIG. 2(a) is a schematic drawing of the handle 20 of the quick-releasing structure 1 of the present invention before the pull. FIG. 2(b) is a schematic drawing of the handle 20 of the quick-releasing structure 1 of the present invention after the pull. As shown in FIG. 2(a), the quick-releasing structure 1 of the present invention is located on a lateral side of the casing 60. The middle of the spring plate 10 is fixed firmly to the casing 60 as a fixing point. The casing 60 is used for receiving a hard disk device 70. Each shock-absorbing member 30 is corresponding to a screw hole 72 of the hard disk device 70. When the hard disk device 70 is installed within the casing 60, each shock-absorbing member 30 of the quick-releasing structure 1 of the present invention can be inserted into the screw hole 72 of the hard disk device 70, thereby the hard disk device 70 can be fastened within the casing 60 with shock-absorbing effect.

If a user wants to remove the hard disk device 70 from the casing 60, the user can pull the handle 20 of the quick-releasing structure 1 of the present invention along the direction indicated by the arrow in FIG. 2(a). As shown in FIG. 2(b), due to the fixing point in the middle of the spring plate 10, the pulling force on the handle 20 can bend the two ends of the spring plate 10 so as to move the shock-absorbing members 30 away from the screw holes 72 of the hard disk device 70. And the movement of the shock-absorbing members 30 can also release the hard disk device 70. Thus, the hard disk device 70 can then be taken out from the casing 60 easily. Conversely, when installing the hard disk device 70 into the casing 60, pulling the handle 20 of the quick-releasing structure 1 of the present invention can allow the shock-absorbing members 30 to move. Next, the user can put the hard disk device 70 within the casing 60 and then releasing the pulling of the handle 20. When releasing the pulling of the handle 20, the elastic restoring force of the spring plate 10 generated by releasing the handle 20 can move the shock-absorbing members 30 back to fasten the hard disk device 70, and the fastening component of the shock-absorbing members 30 is reinserted into the screw hole 72 of the hard disk device 70 to fasten the hard disk device 70.

Figure 3:
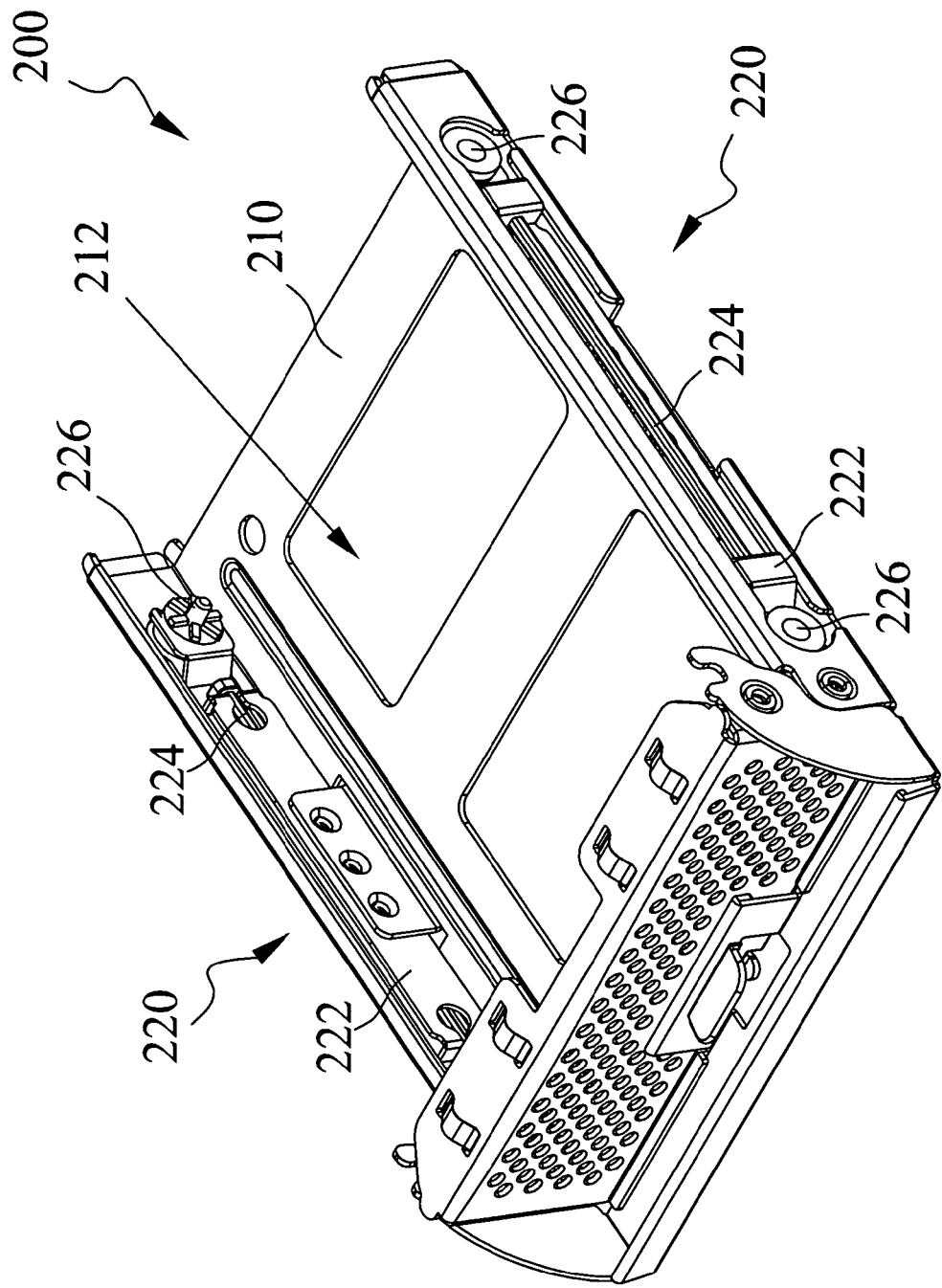
FIG. 3 is a perspective view of a hard disk carrier of the present invention.
Figure 4:
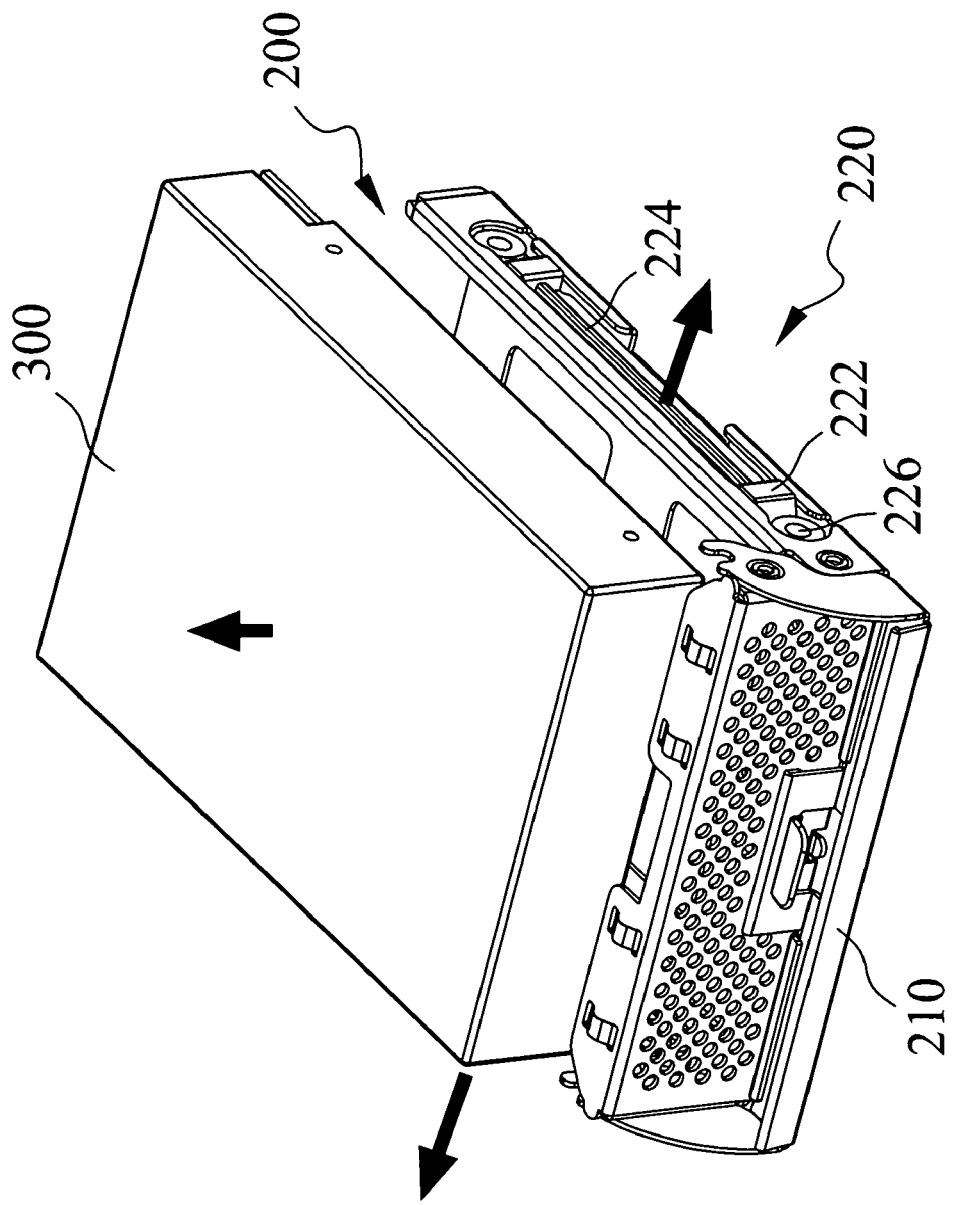
FIG. 4 is a schematic drawing of a hard disk carrier of the present invention received with a hard disk device.

Please refer to FIG. 3 and FIG. 4. FIG. 3 is a perspective view of a hard disk carrier 200 in accordance with the present invention. FIG. 4 is a schematic drawing of the hard disk carrier 200 of the present invention receiving with a hard disk device 300. As shown in FIG. 3 and FIG. 4, a hard disk carrier 200 of the present invention is applied to receive a hard disk device 300. The hard disk carrier 200 can be mounted in a computer system, such as an industrial computer. The hard disk carrier 200 of the present invention comprises a casing 210 and two aforementioned quick-releasing structures 220. The casing 210 comprises a receiving space 212 for containing the hard disk device 300; two quick-releasing structures 220 are fixed onto two sides of the casing 210 in the middle respectively. When installing the hard disk device 300 within the hard disk carrier 200, a user can pull two handles 224 of the quick-releasing structure 220 on two sides of the casing 210 outward at the same time, which can move the shock-absorbing members 226 away from the original position (ie. away the two sides of the casing 210) so that the hard disk device 300 can be placed within the receiving space 212. Next, the user can release the handle 224 to fasten the hard disk device 300 by the shock-absorbing members 226. Conversely, when removing the hard disk device 300 from the hard disk carrier 200, the user also can pull two handles 224 at the same time to bend the spring plate 222 so as to move the shock-absorbing members 226. Thus, the hard disk device 300 can then be taken out from the casing 210 smoothly and easily.

With this design, the user can install and remove the hard disk device 300 rapidly and easily by pulling or moving the handles 224, which facilitates installation/removal greatly. Also, each shock-absorbing member 226 can provide shock-absorbing effect in different directions so as to provide the stability of the hard disk device 300. In addition, the spring plate 222 is made of metal material, which increases the structural strength of the hard disk carrier 200 of the present invention and prevents electromagnetic interference, and also improves the safety of the use of the hard disk device 300.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A quick-releasing structure for fastening a hard disk device within a casing, the quick-releasing structure comprising:
   a spring plate comprising a central portion, wherein the central portion is connected to an outer side of the casing as a fixing point;
   a handle coupled to the spring plate through two ends thereof; and
   two shock-absorbing members connected to two ends of the spring plate respectively for fastening the hard disk device within the casing and providing shock-absorbing effect;
   whereby when pulling the handle, the two ends of the spring plate being moved away from the casing by the fixing point, and the two shock-absorbing members being moved to release the hard disk device.

2. The quick-releasing structure as claimed in claim 1, wherein the spring plate comprises two fixers located at the two ends of the spring plate for fixing the shock-absorbing members respectively.

3. The quick-releasing structure as claimed in claim 1, wherein the spring plate comprises two receiving holes located at the two ends of the spring plate for inserting and engaging the handle.

4. The quick-releasing structure as claimed in claim 3, wherein the receiving hole comprises an inserting portion and an engaging portion, the inserting portion and the engaging portion are contiguous to each other, and a diameter of the inserting portion is larger than a width of the engaging portion.

5. The quick-releasing structure as claimed in claim 4, wherein the handle comprises a rod and two protrusions disposed at two ends of the rod, the diameter of the rod is smaller than the width of the engaging portion, and a maximum outside diameter of the protrusion is between the diameter of the inserting portion and the width of the engaging portion.

6. The quick-releasing structure as claimed in claim 1, wherein each of the shock-absorbing members is corresponding to a screw hole of the hard disk device and the shock-absorbing member can be inserted into the screw hole for fastening the hard disk device within the casing.

7. A hard disk carrier used for fixing with a hard disk device, the hard disk carrier comprising:
a casing;
two quick-releasing structures coupled to two sides of the casing, each quick-releasing structures comprising:
a spring plate comprising a central portion, wherein the central portion is connected to an outer side of the casing as a fixing point;
a handle coupled to the spring plate through two ends of the spring plate; and
two shock-absorbing members connected to two ends of the spring plate respectively for fastening the hard disk device within the casing and providing shock-absorbing effect;
whereby when pulling the handle, the two ends of the spring plate being moved away from the casing by the fixing point, and the two shock-absorbing members being moved to release the hard disk device.

8. The hard disk carrier as claimed in claim 7, wherein the spring plate comprises two fixers located at two ends of the spring plate for fixing the shock-absorbing members respectively.

9. The hard disk carrier as claimed in claim 7, wherein the spring plate comprises two receiving holes located at two ends of the spring plate for inserting and engaging the handle.

10. The hard disk carrier as claimed in claim 9, wherein the receiving hole comprises an inserting portion and an engaging portion, the inserting portion and the engaging portion are contiguous to each other, and a diameter of the inserting portion is larger than a width of the engaging portion.

11. The hard disk carrier as claimed in claim 10, wherein the handle comprises a rod and two protrusions disposed at two ends of the rod, a diameter of the rod is smaller than the width of the engaging portion, and a maximum outside diameter of the protrusion is between the diameter of the inserting portion and the width of the engaging portion.

12. The hard disk carrier as claimed in claim 7, wherein each of the shock-absorbing members is corresponding to a screw hole of the hard disk device and the shock-absorbing member can be inserted into the screw hole for fastening the hard disk device within the casing.

13. A computer system comprising a hard disk carrier for fixing with a hard disk device, the hard disk carrier comprising:
a casing;
two quick-releasing structures coupled to two sides of the casing, each quick-releasing structures comprising:
a spring plate comprising a central portion, wherein the central portion is connected to an outer side of the casing as a fixing point;
a handle coupled to the spring plate through two ends thereof; and
two shock-absorbing members connected to two ends of the spring plate respectively for fastening the hard disk device within the casing and providing shock-absorbing effect;
whereby when pulling the handle, the two ends of the spring plate being moved away from the casing by the fixing point, and the two shock-absorbing members being moved to release the hard disk device.

14. The computer system as claimed in claim 13, wherein the spring plate comprises two receiving holes located at two ends of the spring plate for inserting and engaging the handle.

15. The computer system as claimed in claim 14, wherein the receiving hole comprises an inserting portion and an engaging portion, the inserting portion and the engaging portion are contiguous to each other, and a diameter of the inserting portion is larger than a width of the engaging portion.

16. The computer system as claimed in claim 15, wherein the handle comprises a rod and two protrusions disposed at two ends of the rod, a diameter of the rod is smaller than the width of the engaging portion, and a maximum outside diameter of the protrusion is between the diameter of the inserting portion and the width of the engaging portion.

17. The computer system as claimed in claim 13, wherein each of the shock-absorbing members is corresponding to a screw hole of the hard disk device and the shock-absorbing member can be inserted into one screw hole for fixing the hard disk device within the casing.

* * * * *